No. 693,514. Patented Feb. 18, 1902.
A. HABERSTROH.
ADHESIVE FASTENER.
(Application filed Nov. 4, 1901.)

(No Model.)

Witnesses.
Charles A. Harris.
Charles F. Logan.

Inventor:
Albert Haberstroh.
by Alban Andren. his atty.

THE NORRIS PETERS CO., PHOTO-LITHO., WASHINGTON, D. C.

UNITED STATES PATENT OFFICE.

ALBERT HABERSTROH, OF BOSTON, MASSACHUSETTS.

ADHESIVE FASTENER.

SPECIFICATION forming part of Letters Patent No. 693,514, dated February 18, 1902.

Application filed November 4, 1901. Serial No. 81,038. (No model.)

*To all whom it may concern:*

Be it known that I, ALBERT HABERSTROH, a citizen of the United States, and a resident of Boston, in the county of Suffolk and State of Massachusetts, have invented certain new and useful Improvements in Adhesive Fasteners, of which the following is a specification.

This invention relates to improvements in adhesive fasteners for the purpose of attaching sheets of paper, cloth, &c., to surfaces or objects, as may be desired, as will hereinafter be more fully shown and described, reference being had to the accompanying drawings, wherein—

Figure 1:
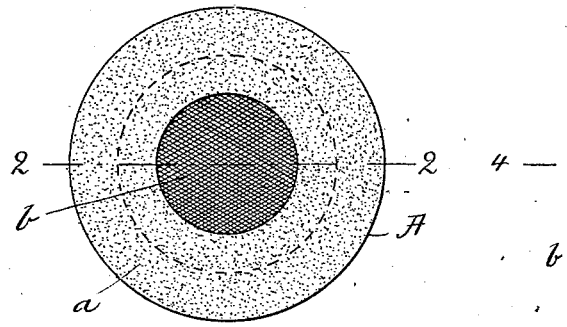
Figure 3:
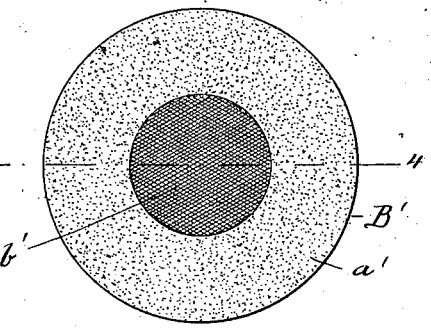
Figure 2:
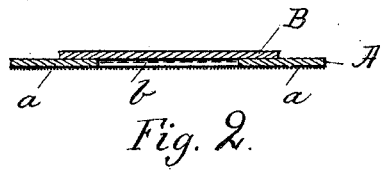
Figure 4:
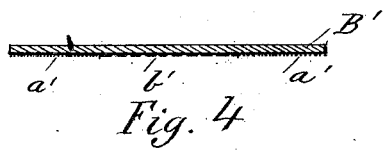

Figure 1 is a front elevation of one form of the improved adhesive fastener. Fig. 2 is a cross-section on the line 2 2 shown in Fig. 1. Fig. 3 is a front elevation of a similar form of the said adhesive fastener, and Fig. 4 is a cross-section on the line 4 4 shown in Fig. 3.

Similar letters refer to similar parts wherever they occur on the different parts of the drawings.

The device may be composed of one or two parts, as may be desired. In Figs. 1 and 2 it is shown as composed of two parts A and B, connected or otherwise secured together. In Figs. 1 and 2 the portion A is made annular, ring-shaped, or perforated, as shown, and the other portion, B, is made, preferably, solid.

The exposed faces of the annular disk A and the disk B are coated in whole or part with respective adhesive coatings $a$ and $b$, as shown. In practice I prefer to use a gum-arabic or similar moisture-solvent coating $a$ for the annular disk A and a rubber-cement or similar coating $b$ for the central (preferably solid) disk B, adapted to adhere to the object by heat or pressure.

The object of providing the fastener with two separate and differing adhesive coatings is for the purpose of causing one portion—namely, the rubber-cement-coated portion—to hold the other portion—namely, the moistened gum-arabic-coated portion—in place while drying against the objects which are to be attached by the improved fastener.

Although in practice I prefer to provide the annular disk A with a gum-arabic or similar moisture-solvent coating and the preferably solid disk B with a rubber-cement or similar coating, I wish to state that I may without departing from the essence of my invention use a rubber-cement coating on the annular portion and a gum-arabic on the central portion of the fastener, if so desired.

Instead of making the fastener of two parts I may to equal advantage make it from a single piece B', the face of which is wholly or partially coated centrally with rubber cement $b'$ or a similar coating adapted to adhere to the object by heat or pressure and with a coating $a'$ of gum-arabic or similar moisture-solvent material, as shown in Figs. 3 and 4, or such coatings may be reversed—that is, the central portion may be coated with gum-arabic or similar material and the annular portion with a rubber-cement or similar material.

The adhesive fastener, whether composed of one or two parts, may be made of paper, cloth, or other suitable fibrous, textile, or other materials.

The adhesive coatings may be applied wholly or partially to the respective annular and central portions of the fastener without departing from the essence of my invention.

In using this my improved adhesive fastener for the purpose of attaching two sheets or other objects together I moisten the gum-arabic or similarly coated surface and place the fastener onto the objects to be secured together and press it onto the latter, by which the rubber-cemented portion is caused to adhere by pressure, serving as a means to hold the gum-arabic-coated portion in contact with the objects until set and stuck onto the said objects that are to be attached together by the adhesive fastener.

What I wish to secure by Letters Patent and claim is—

The herein-described adhesive fastener, consisting of two members attached together, one of which members is annular and the other of which is preferably solid, the face of one of said members being coated with a rubber or similar cement, and the face of the other member being coated with gum-arabic or similar moisture-solvent material substantially as and for the purpose set forth.

In testimony whereof I have affixed my signature in presence of two witnesses.

ALBERT HABERSTROH.

Witnesses:
ALBAN ANDRÉN,
CHARLES F. LOGAN.